(12) United States Patent
Zhao et al.

(10) Patent No.: US 10,834,627 B2
(45) Date of Patent: Nov. 10, 2020

(54) DATA TRANSMISSION METHOD AND DEVICE IN DEVICE TO DEVICE COMMUNICATION

(71) Applicant: China Academy of Telecommunications Technology, Beijing (CN)

(72) Inventors: Yali Zhao, Beijing (CN); Erlin Zeng, Beijing (CN); Jing Fu, Beijing (CN); Fangli Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 167 days.

(21) Appl. No.: 15/107,873

(22) PCT Filed: Dec. 26, 2014

(86) PCT No.: PCT/CN2014/095082
§ 371 (c)(1),
(2) Date: Jun. 23, 2016

(87) PCT Pub. No.: WO2015/101218
PCT Pub. Date: Jul. 9, 2015

(65) Prior Publication Data
US 2017/0006649 A1   Jan. 5, 2017

(30) Foreign Application Priority Data
Jan. 2, 2014   (CN) .......................... 2014 1 0001603

(51) Int. Cl.
*H04W 28/02* (2009.01)
*H04W 28/06* (2009.01)
(Continued)

(52) U.S. Cl.
CPC ......... *H04W 28/0278* (2013.01); *H04W 4/08* (2013.01); *H04W 28/06* (2013.01);
(Continued)

(58) Field of Classification Search
CPC ..... H04W 28/06; H04W 4/08; H04W 76/023; H04W 28/0278; H04W 72/04;
(Continued)

(56) References Cited

U.S. PATENT DOCUMENTS 9,629,125 B2 *   4/2017   Lu .......................... H04W 72/04
10,305,650 B2 *  5/2019   Kim ......................... H04L 5/00
(Continued)

FOREIGN PATENT DOCUMENTS

| CN | 102083138 A | * | 6/2011 | ............ H04W 28/06 |
| CN | 102118858 A | * | 7/2011 | |

(Continued)

OTHER PUBLICATIONS

"Study on architecture enhancements to support Proximity-based Services (ProSe); 3GPP TR 23.703", 3rd Generation Partnership Project (3GPP) Standard, Dec. 5, 2013 (Dec. 5, 2013), XP050728677, [retrieved on Dec. 5, 2013].
(Continued)

*Primary Examiner* — Un C Cho
*Assistant Examiner* — Shah M Rahman
(74) *Attorney, Agent, or Firm* — Foley & Lardner LLP

(57) ABSTRACT

Disclosed are a data transmission method and device for device to device (D2D) communication, the method comprising: determining D2D communication destinations corresponding to a user equipment (UE) of a transmitting end; allocating a corresponding resource for each D2D communication destination; according to the resource corresponding to each D2D communication destination, generating a medium access control protocol data unit (MAC PDU)
(Continued)

corresponding to the D2D communication destinations, and transmitting the MAC PDUs using the resource corresponding to the D2D communication destinations. The present invention separately generates a MAC PDU for each D2D communication destination of a UE of a transmitting end, thus preventing the data from one device to different D2D communication destination devices from being multiplexed into one MAC PDU, further reducing header overhead of the MAC PDU and eliminating unnecessary blind detection of a device of a receiving end, thereby saving power.

18 Claims, 6 Drawing Sheets

(51) Int. Cl.
   *H04W 4/08* (2009.01)
   *H04W 76/14* (2018.01)
   *H04W 72/04* (2009.01)
   *H04W 76/11* (2018.01)
(52) U.S. Cl.
   CPC ............ *H04W 76/14* (2018.02); *H04W 72/04* (2013.01); *H04W 76/11* (2018.02); *Y02D 70/00* (2018.01); *Y02D 70/1262* (2018.01); *Y02D 70/21* (2018.01)
(58) Field of Classification Search
   CPC ... H04W 76/11; H04W 76/14; H04W 76/021; Y02D 70/1262; Y02D 70/21; Y02D 70/00
   USPC .......................................................... 370/329
   See application file for complete search history.

(56) References Cited

U.S. PATENT DOCUMENTS

| | | | | |
|---|---|---|---|---|
| 2010/0009675 | A1* | 1/2010 | Wijting | H04W 76/023 455/426.1 |
| 2012/0106517 | A1* | 5/2012 | Charbit | H04W 72/04 370/336 |
| 2012/0129540 | A1* | 5/2012 | Hakola | H04W 72/042 455/450 |
| 2012/0302272 | A1 | 11/2012 | Hakola et al. | |
| 2013/0223399 | A1* | 8/2013 | Lu | H04W 76/14 370/329 |
| 2013/0322413 | A1 | 12/2013 | Pelletier et al. | |
| 2013/0322416 | A1 | 12/2013 | Son | |
| 2014/0241262 | A1* | 8/2014 | Novak | H04W 72/042 370/329 |
| 2014/0313949 | A1* | 10/2014 | Lilleberg | H04L 5/0037 370/280 |
| 2014/0314009 | A1* | 10/2014 | Xiong | H04W 28/16 370/329 |
| 2015/0023267 | A1* | 1/2015 | Lim | H04W 72/0406 370/329 |
| 2015/0045078 | A1* | 2/2015 | Lee | H04B 7/26 455/509 |
| 2015/0071212 | A1* | 3/2015 | Kim | H04W 74/0833 370/329 |
| 2015/0126211 | A1* | 5/2015 | Morita | H04W 76/14 455/452.1 |
| 2015/0163689 | A1* | 6/2015 | Lee | H04W 76/14 370/328 |
| 2015/0163822 | A1* | 6/2015 | Guo | H04W 72/121 370/329 |
| 2015/0181587 | A1* | 6/2015 | Yang | H04W 72/042 370/329 |
| 2015/0208452 | A1* | 7/2015 | Lee | H04W 76/27 455/426.1 |
| 2015/0305080 | A1* | 10/2015 | Xu | H04L 12/6418 370/329 |
| 2016/0073392 | A1* | 3/2016 | Byun | H04W 72/048 370/280 |
| 2016/0183276 | A1* | 6/2016 | Marinier | H04W 72/02 370/329 |
| 2016/0192420 | A1* | 6/2016 | Kim | H04W 74/002 370/329 |
| 2016/0295565 | A1* | 10/2016 | Kim | H04W 76/14 |
| 2016/0309503 | A1* | 10/2016 | Quan | H04W 76/20 |
| 2016/0374068 | A1* | 12/2016 | Kim | H04W 72/04 |
| 2017/0230937 | A1* | 8/2017 | Nguyen | H04W 72/02 |

FOREIGN PATENT DOCUMENTS

| | | | | |
|---|---|---|---|---|
| CN | 102158901 | A * | 8/2011 | ............ H04W 28/06 |
| CN | 102334370 | | 1/2012 | |
| CN | 103002578 | | 3/2013 | |
| CN | 103139764 | | 6/2013 | |
| CN | 103458534 | A | 12/2013 | |
| CN | 103634778 | A * | 3/2014 | |
| JP | 2012-227648 | A | 11/2012 | |
| WO | WO-2013/154326 | A1 | 10/2013 | |
| WO | WO-2013/183732 | A1 | 12/2013 | |

OTHER PUBLICATIONS

ZTE: "Study on D2D Resource Allocation; 3GPP Draft R1-135370", 3rd Generation Partnership Project (3GPP) Draft, Nov. 13, 2013 (Nov. 13, 2013), XP050735052, Retrieved from the Internet: URL:http://www.3gpp.org/ftp/Meetings_3GPP_SYNC/RAN/RAN1/Docs/ [retrieved on Nov. 13, 2013].

International Search Report for PCT /CN2014/095082 dated Apr. 21, 2015.

3rd Generation Partnership Project. "Medium Access Control (MAC) Protocol Specification (Release 11);" Technical Specification Group Radio Access Network; Evolved Universal Terrestrial Radio Access (E-UTRA); 3GPP TS 36.321 VII.3.0, Jun. 30, 2013 (Jun. 30, 2013), section 6.

3GPP TSG RAN WG2 Meeting #84 R2-134293, "MAC PDU format for D2D 1:M communication" Intel Corporation, San Francisco, U.S.A, Nov. 11-15, 2013, (pp. 2).

* cited by examiner

R/R/E/LCID Sub-header

DATA TRANSMISSION METHOD AND DEVICE IN DEVICE TO DEVICE COMMUNICATION

This application is a National Stage of International Application No. PCT/CN2014/095082, filed on Dec. 26, 2014, designating the United States and claiming the benefit of Chinese Patent Application No. 201410001603.3, filed with the Chinese Patent Office on Jan. 2, 2014 and entitled "Method and apparatus for transmitting data in device to device communication", which is hereby incorporated by reference in its entirety.

FIELD

The present invention relates to the field of mobile communications, and particularly to a method and apparatus for transmitting data in device to device communication.

BACKGROUND

1. LTE. D2N Communication System

In a Long Term Evolution (LTE) system, transmission and reception of data is controlled centrally by a network, that is, both uplink and downlink data of a User Equipment (UE) are transmitted and received under control of the network. Communication between UEs is relayed and controlled by the network, and there is no direct communication link between the UEs. In this scheme, data transmission between the UE and the network can be referred simply to as Device to Network (D2N) transmission.

A Buffer State Report (BSR) mechanism in an LTE D2N communication system is as follows:

An object of a BSR is as follows:

All the LTE systems are scheduling-based systems where an eNB allocates time-frequency resources for a UE to transmit data, and the UE receives downlink data or transmits uplink data according to a scheduling command of the eNB. Transmission of uplink data is scheduled by the eNB, where an eNB scheduler determines an uplink resource allocation condition and then notifies the UE in a UL grant. The eNB scheduler allocates an uplink resource according to the amount of uplink data to be transmitted by the UE, i.e., the state of a buffer of the UE. The buffer resides at the UE side, and if the eNB intends to know information about the state of the buffer, then the UE will make a Buffer State Report (BSR) to the eNB. The BSR mechanism is as follows in the LTE Rel-11 and the earlier releases.

BSR related RRC layer parameters are configured as follows:

In the LTE system, the RRC layer parameters configured for the BSR include the following two timers, both of which are configured and maintained per UE:

retxBSR-Timer which is a timer with a BSR being disabled; and periodicBSR-Timer which is a timer with a BSR being made periodically.

A BSR category and a trigger mechanism thereof are as follows:

A regular BSR, which is (1) triggered when there are incoming data with a higher priority than current data in the buffer or incoming new data in the originally empty buffer; and (2) triggered when the retxBSR-Timer expires and there are data in the buffer.

A periodic BSR which is triggered when the periodicBSR-Timer expires.

A padding BSR which can be triggered if the UE organizing a Medium Access Control Protocol Data Unit (MAC PDU) has resources available (padding) in addition to data to be transmitted.

A BSR report principle is as follows:

For the regular BSR and the periodic BSR, if more than one Logical Channel Group (LCG) has data available, then along BSR will be made; otherwise, a short BSR will be made; and For the padding BSR, if the number of padding bits is larger than or equal to a short BSR plus an MAC sub-header, but smaller than a long BSR plus an MAC sub-header, then if more than one LCG of the UE has data available, then a truncated BSR will be reported; otherwise, a short BSR will be reported; and if the number of padding bits is larger than or equal to a long BSR plus an MAC sub-header, then a long BSR will be reported; and After the BSR is triggered, either of the periodic BSR or the padding BSR can be reported only if there is an uplink resource available, and if there is no uplink resource available to the regular BSR, then a Scheduling Request (SR) procedure will be triggered to request the eNB for allocating an uplink resource to the UE.

After the eNB allocates the uplink resource to the UE, if the resource is just sufficient to transmit all the uplink data, then no BSR may be transmitted but the uplink data will be transmitted directly; and if the resource is not sufficient to transmit all the uplink data, then the regular BSR or the periodic BSR will be reported preferentially, and the eNB will be further perform subsequent transmission scheduling according to the amount of uplink data required for the UE reported in the BSR.

A MAC PDU includes at most one BSR. The order of BSR priorities is the regular BSR=the periodic BSR>the padding BSR, and if a plurality of BSRs are triggered concurrently, then the BSR at the highest priority will only be reported, and since the contents of the regular BSR and the periodic BSR are the same, where both of them include information about the amount of all the data available in the UE buffer, the report formats are totally the same, and it will suffice to report either of them. The MAC layer organizing an MAC PDU firstly places MAC CEs of these two reports and then an MAC SDU.

The priority of the padding BSR is lower than priority of the data. The padding BSR and the regular/periodic BSR can be made in different MAC PDUs in the same sub-frame.

After the BSR is made:

If the BSR is triggered and can be made, then the periodicBSR-Timer and the retxBSR-Timer will be started or restarted, but:

It shall be noted that for the truncated BSR, the periodicBSR-Timer cannot be started or restarted, but only the retxBSR-Timer will be started or restarted.

The BSR is made in the following format:

The BSR is reported in the form of an MAC Control Element (CE) including two components which are an MAC sub-header and an MAC CE, where the BSR MAC CE includes two formats of a long BSR and a short BSR, and the truncated BSR is in the same format as the short BSR. FIG. 1, FIG. 2, and FIG. 3 illustrates the formats of the MAC sub-header and the BSR MAC CE in the LTE system.

Their respective fields are defined as follows:

A Logical Channel ID (LCID) identifies a logical channel number corresponding to a payload, where each of the long BSR, the short BSR, and the truncated BSR has a LCID.

E represents an extended bit to indicate whether a next byte belongs to the MAC sub-header or the payload.

R represents a reserved bit.

An LCG ID represents a logical channel group number. There are four groups of logical channels for the BSR to be made in the LTE system.

A Buffer Size represents the amount of buffered data in the corresponding group of logical channels.

For the BSR to be made, the R10/11 releases are different from the R8/9 releases in that the new BS table has been introduced to the R10/11 releases because aggregation of carriers has been supported, and the peak rate has been improved. The eNB configures via RRC signaling the R10/11-enabled UE to make the BSR using the new BS table or not. Both the R8/9 BS table and the R10/11 BS table are quantified into 64 levels, that is, a corresponding quantified value can be represented in 6 bits, so the value of the buffer size for each LCG in the BSR MAC CE format above is represented in 6 bits.

2. LTE D2D Communication System

Direct Device to Device (D2D) communication is allowed between devices proximate to each other. For the sake of a convenient description, a direct communication link between D2D terminals will be referred to as a Device to Device (D2D) link, and a cellular communication link between the network and the D2D terminal will be referred to as a Device to Network (D2N) link.

Here all the devices in D2D communication can be online, or can be offline, or some of the devices can be online, and the other devices can be offline. An online device refers to a device participating in D2D communication, which resides in the coverage area of a 3GPP network, and accesses a spectrum resource of the 3GPP network, and an offline device refers to a device participating in D2D communication, which resides out of the coverage area of the 3GPP network, or resides in the coverage area of the 3GPP network but accesses a special spectrum resource of the D2D communication.

Here there are the following three typical D2D communication scenarios: D2D UEs perform one-to-one communication; one device transmits the same data once to all devices in one communication group (group communication); and one device transmits the same data once to all adjacent devices (broadcast communication).

Here the scenario where the one-to-one communication between the D2D UEs is generally applicable to social and other similar applications, and the scenario of group/broadcast communication is generally applicable to fire fighting, rescue, antiterrorism, etc., in public security applications.

At present, resources are generally allocated for D2D communication in a centralized or distributed mode, where:

If resources are allocated in a distributed mode, then the UE itself will listen to resources in a pool of resources for idle resources, and if there are idle resources, then the UE itself can select the idle resources for D2D communication. In this mode, different UEs may select the same D2D communication resource, thus resulting in collision.

If resources are allocated in a centralized mode, then a resource allocation control node will be introduced, which is responsible for managing allocation of D2D communication resources in a specific range (e.g., a group, a cell, etc.). If there are online UEs, then typically the eNB will be selected as the resource allocation control node; and if there are offline then some one of the UEs will be selected as the resource allocation control node, where this UE is generally referred to as a Cluster Header (CH).

At present, generally the D2D devices support parallel D2D communication, that is, one D2D device can conduct D2D communication concurrently with a number of D2D communication destinations, and in this case, it is necessary to take into account how the MAC layer organizes an MAC PDU so as to guarantee a low overhead of the MAC PDU, and to prevent the D2D communication devices from performing unnecessary blind detection, so it is desirable to propose a solution to data transmission in device to device communication so as to guarantee a low overhead of the MAC PDU, and to prevent the D2D communication devices from performing unnecessary blind detection.

SUMMARY

In view of the technical solutions in the prior art, the invention proposes a method and apparatus for transmitting data in device to device communication so that data from one device to different destination devices will not be multiplexed in one MAC PDU so as to low a header overhead of the MAC PDU, and to prevent the D2D communication receiving devices from performing unnecessary blind detection to thereby save power.

The technical solutions of the invention are achieved as follows:

According to an aspect of the invention, there is provided a method for transmitting data in device to device communication.

The method for transmitting data in device to device communication includes:

determining Device to Device (D2D) communication destinations corresponding to a transmitting User Equipment (UE);

allocating corresponding resources for each D2D communication destination and generating for the resources corresponding to each D2D communication destination a media Access Control Protocol Data Unit (MAC PDU) corresponding to the D2D communication destination, and transmitting the MAC PDU over the resources corresponding to the D2D communication destination.

Moreover the method for transmitting data in device to device communication further includes: pre-configuring a corresponding D2D communication destination identifier for the D2D communication destination and carrying the D2D communication destination identifier in a Media Access Control (MAC) sub-header in the MAC PDU, or a Media Access Control Service Data Unit (MAC SDU) in the MAC PDU.

Preferably the D2D communication destination identifier includes at least one of a group identifier, a broadcast identifier, a destination UE identifier, and a Radio Bearer (RB) identifier.

Preferably allocating corresponding resources for each D2D communication destination can include: receiving D2D Buffer State Report (BSR) information corresponding to each D2D communication destination, reported by the transmitting UE; determining the corresponding resources allocated for each D2D communication destination, according to the D2D BSR information; and generating resource allocation information according to the determined resources allocated for each D2D communication destination, and sending the resource allocation information to the transmitting UE, so that the transmitting UE determines the resources allocated for each D2D communication destination according to the resource allocation information.

Preferably the resource allocation information includes a D2D communication destination identifier corresponding to each D2D communication destination, and the resources corresponding to each D2D communication destination.

Preferably the transmitting UE reports the BSR information corresponding to each D2D communication destination individually or jointly.

Preferably a condition to trigger the transmitting UE to report the D2D BSR information corresponding to the D2D communication destination includes at least one of the followings: there are incoming data with a higher priority than current data in a D2D buffer of the D2D communication destination; there are incoming new data in an originally empty D2D buffer corresponding to the D2D communication destination; a D2D BSR periodicity timer of the D2D communication destination expires; and when the MAC PDU is generated for the D2D communication destination, the resources corresponding to the D2D communication destination include available resources in addition to resources required for transmitting D2D data.

Preferably the D2D BSR information includes a D2D communication destination identifier corresponding to the D2D communication destination, and Buffer State (BS) information of a D2D buffer corresponding to the D2D communication destination.

Moreover allocating corresponding resources for each D 13 communication destination can include: determining the amount of data to be transmitted over each D2D channel or group of logical channels corresponding to each D2D communication destination; and allocating the corresponding resources for each D2D communication destination according to the amount of data, and a pool of resources corresponding to each D2D communication destination.

Furthermore generating for the resources corresponding to each D2D communication destination the media Access Control Protocol Data Unit (MAC PDU) corresponding to the D2D communication destination can include: determining a priority of each D2D Radio Bearer (RB) corresponding to the D2D communication destination, ranking the D2D RBs in a descending order of their priorities, and generating a queue of D2D RB priorities corresponding to the D2D communication destination; and allocating the resources corresponding to the D2D communication destination according to the queue of D2D RB priorities, and generating the MAC PDU corresponding to the D2D communication destination according to a result of allocating the resources.

Preferably allocating the resources corresponding to the D2D communication destination according to the queue of D2D RB priorities, and generating the MAC PDU corresponding to the D2D communication destination according to the result of allocating the resources can include: allocating the resources for each D2D RB corresponding to the D2D communication destination as per Prioritized Bit Rate (PBR) according to the queue of D2D RB priorities; and when there are no remaining resources after the resources are allocated, then determining resources allocated to each D2D RB in the D2D communication destination according to the result of allocating the resources, and organizing the corresponding MAC PDU for the D2D communication destination according to the resources.

Furthermore allocating the resources corresponding to the D2D communication destination according to the queue of D2D RB priorities, and generating the MAC PDU corresponding to the D2D communication destination according to the result of allocating the resources can further include: when there are remaining resources after the resources are allocated, then allocating the remaining resources for data, for which no resources have been allocated, of each D2D RB corresponding to the D2D communication destination according to the queue of D2D RB priorities, and determining that all the remaining resources have been allocated, after all the data of each D2D RB in the queue of D2D RB priorities have resources allocated thereto, or all the remaining resources are allocated; and after all the remaining resources are allocated, then determining the resources allocated to each D2D RB in the D2D communication destination according to the result of allocating the resources and the remaining resources, and organizing the corresponding MAC PDU for the D2D communication destination according to the resources.

According to another aspect of the invention, there is provided an apparatus for transmitting data in device to device communication.

The apparatus for transmitting data in device to device communication includes:

a determining module configured to determine Device to Device (D2D) communication destinations corresponding to a transmitting User Equipment (UE);

an allocating module configured to allocate corresponding resources for each D2D communication destination; and a processing module configured to generate for the resources corresponding to each D2D communication destination a media Access Control Protocol Data Unit (MAC PDU) corresponding to the D2D communication destination, and to transmit the MAC PDU over the resources corresponding to the D2D communication destination.

Moreover the apparatus for transmitting data in device to device communication further includes: a configuring module configured to pre-configure a corresponding D2D communication destination identifier for the D2D communication destination.

Furthermore the processing module is further configured to carry the D2D communication destination identifier in a Media Access Control (MAC) sub-header in the MAC PDU, or a Media Access Control Service Data Unit (MAC SDU) in the MAC PDU.

Preferably the D2D communication destination identifier includes at least one of: a group identifier, a broadcast identifier, a destination UE identifier, and a Radio Bearer (RB) identifier.

Preferably the allocating module can further include: a receiving sub-module configured to receive D2D Buffer State Report (BSR) information corresponding to each D2D communication destination, reported by the transmitting UE; a first determining sub-module configured to determine the corresponding resources allocated for each D2D communication destination, according to the D2D BSR information; and a processing sub-module configured to generate resource allocation information according to the determined resources allocated for each D2D communication destination, and to send the resource allocation information to the transmitting UE, so that the transmitting UE determines the resources allocated for each D2D communication destination according to the resource allocation information.

Preferably the resource allocation information can include a D2D communication destination identifier corresponding to each D2D communication destination, and the resources corresponding to each D2D communication destination.

Preferably the transmitting UE reports the D2D BSR information corresponding to each D2D communication destination individually or jointly.

Preferably a condition to trigger the transmitting UE to report the D2D BSR information corresponding to the D2D communication destination includes at least one of the followings: there are incoming data with a higher priority than current data in a D2D buffer of the D2D communication destination; there are incoming new data in an originally empty D2D buffer corresponding to the D2D communication destination; a D2D BSR periodicity timer of the D2D communication destination expires; and when the MAC PDU is generated for the D2D communication destination, the resources corresponding to the D2D communication destination include available resources in addition to resources required for transmitting D2D data.

Preferably the D2D BSR information includes a D2D communication destination identifier corresponding to the D2D communication destination, and Buffer State (BS) information of a D2D buffer corresponding to the D2D communication destination.

Moreover the allocating module can further include: a second determining sub-module configured to determine the amount of data to be transmitted over each D2D logical channel or group of logical channels corresponding to each D2D communication destination; and a first allocating sub-module configured to allocate the corresponding resources for each D2D communication destination according to the amount of data, and a pool of resources corresponding to each D2D communication destination.

Preferably the processing module can further include: a third determining sub-module configured to determine a priority of each D2D Radio Bearer (RB) corresponding to the D2D communication destination, to rank the D2D RBs in a descending order of their priorities, and to generate a queue of D2D RB priorities corresponding to the D2D communication destination; and a generating sub-module configured to allocate the resources corresponding to the D2D communication destination according to the queue of D2D RB priorities, and to generate the MAC PDU corresponding to the D2D communication destination according to a result of allocating the resources.

Preferably the generating sub-module can further include: a second allocating sub-module configured to allocate the resources for each D2D RB corresponding to the D2D communication destination as per Prioritized Bit Rate (PBR) according to the queue of D2D RB priorities, and an organizing sub-module configured, when there are no remaining resources after the resources are allocated, to determine resources allocated to each D2D RB in the D2D communication destination according to the result of allocating the resources, and to organize the corresponding MAC PDU for the D2D communication destination according to the resources.

Furthermore the generating sub-module can further include: a third allocating sub-module configured, when there are remaining resources after the resources are allocated, to allocate the remaining resources for data, for which no resources have been allocated, of each D2D RB corresponding to the D2D communication destination according to the queue of D2D RB priorities, and to determine that all the remaining resources have been allocated, after all the data of each D2D RB in the queue of D2D RB priorities have resources allocated thereto, or all the remaining resources are allocated; and the organizing sub-module is further configured, after all the remaining resources are allocated, to determine the resources allocated to each D2D RB in the D2D communication destination according to the result of allocating the resources and the remaining resources, and to organize the corresponding MAC PDU for the D2D communication destination according to the resources.

In the invention, an MAC PDU can be generated separately for each D2D communication destination of the transmitting UE, so that data from one device to different D2D communication destination devices will not be multiplexed in one MAC PDU so as to low a header overhead of the MAC PDU, and to prevent the receiving devices from performing unnecessary blind detection to thereby save power.

BRIEF DESCRIPTION OF THE DRAWINGS

In order to make the technical solutions according to the embodiments of the invention or in the prior art more apparent, the drawings to which reference will be made in the description of the embodiments will be described below briefly, and apparently the drawings described below are illustrative only some of the embodiments of the invention, and those ordinarily skilled in the art can further derive other drawings from these embodiments here without any inventive effort. In the drawings.

DETAILED DESCRIPTION OF THE EMBODIMENTS

The technical solutions in the embodiments of the invention will be described below clearly and fully with reference to the drawings, and apparently the embodiments described below are only some but not all of the embodiments of the invention. All the other embodiments which can occur to those ordinarily skilled in the art based upon the embodiments here of the invention without any inventive effort shall fall into the scope of the invention as claimed.

According to an embodiment of the invention, there is provided a method for transmitting data in device to device communication.

Figure 1:
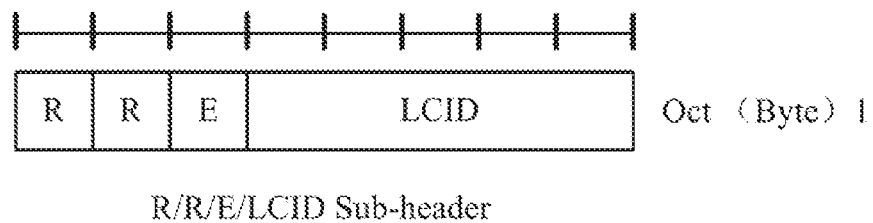
FIG. 1 is a schematic diagram of the format of the MAC sub-header in the existing LTE system.
Figure 2:
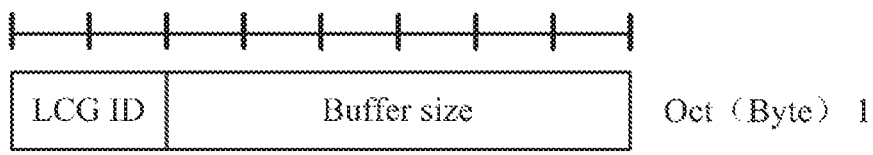
FIG. 2 is a schematic diagram of the MAC CE format of the short D2D BSR and the truncated D2D BSR in the existing LTE system.
Figure 3:
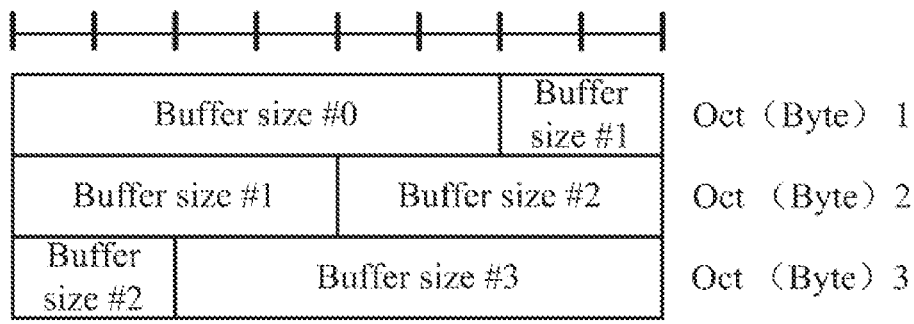
FIG. 3 is a schematic diagram of the format of the long D2D BSR in the existing LTE system.
Figure 4:
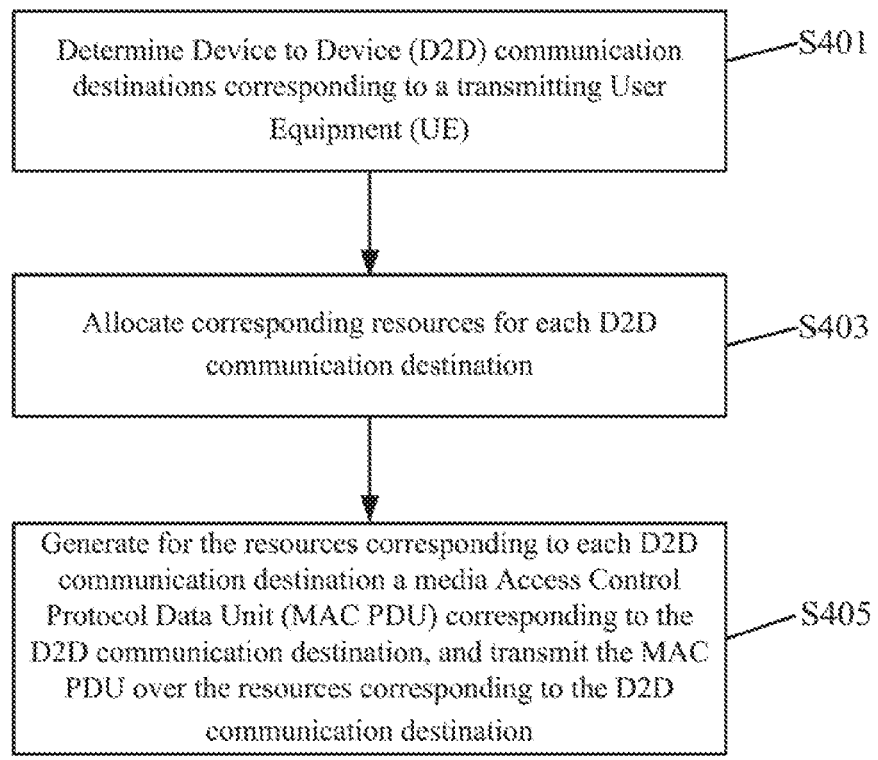
FIG. 4 is a schematic flow chart of a method for transmitting data in device to device communication according to an embodiment of the invention.

As illustrated in FIG. 4, the method for transmitting data in device to device communication according to the embodiment of the invention includes:

The step S401 is to determine Device to Device (D2D) communication destinations corresponding to a transmitting User Equipment (UE);

The step S403 is to allocate corresponding resources for each D2D communication destination; and The step S405 is to generate for the resources corresponding to each D2D communication destination a media Access Control Protocol Data Unit (MAC PDU) corresponding to the D2D communication destination, and to transmit the MAC PDU over the resources corresponding to the D2D communication destination.

Moreover the method for transmitting data in device to device communication further includes: pre-configuring a corresponding D2D communication destination identifier for the D2D communication destination, and carrying the D2D communication destination identifier in a Media Access Control (MAC) sub-header in the MAC PDU, or a Media Access Control Service Data Unit (MAC SDU) in the MAC PDU.

Here the D2D communication destination identifier includes at least one of a group identifier, a broadcast identifier, a destination UE identifier, and a Radio Bearer (RB) identifier.

Here the corresponding resources can be allocated for each D2D communication destination by receiving D2D Buffer State Report (BSR) information corresponding to each D2D communication destination, reported by the transmitting UE; determining the corresponding resources allocated for each D2D communication destination, according to the D2D BSR information; and generating resource allocation information according to the determined resources allocated for each D2D communication destination, and sending the resource allocation information to the transmitting UE, so that the transmitting UE determines the resources allocated for each D2D communication destination according to the resource allocation information.

Here the resource allocation information includes a D2D communication destination identifier corresponding to each D2D communication destination, and the resources corresponding to each D2D communication destination.

Here the transmitting UE reports the D2D BSR information corresponding to each D2D communication destination individually or jointly.

Here a condition to trigger the transmitting UE to report the D2D BSR information corresponding to the D2D communication destination includes at least one of the followings: there are incoming data with a higher priority than current data in a D2D buffer of the D2D communication destination; there are incoming new data in an originally empty D2D buffer corresponding to the D2D communication destination; a D2D BSR periodicity timer of the D2D communication destination expires; and when MAC PDU is generated for the D2D communication destination, the resources corresponding to the D2D communication destination include available resources in addition to resources required for transmitting D2D data.

Here the D2D BSR information includes a D2D communication destination identifier corresponding to the D2D communication destination, and Buffer State (BS) information of a D2D buffer corresponding to the D2D communication destination.

Moreover the corresponding resources can alternatively be allocated for each D2D communication destination by determining the amount of data to be transmitted over each D2D logical channel or group of logical channels corresponding to each D2D communication destination; and allocating the corresponding resources for each D2D communication destination according to the amount of data, and a pool of resources corresponding to each D2D communication destination.

Furthermore, for the resources corresponding to each D2D communication destination, the media Access Control Protocol Data Unit (MAC PDU) corresponding to the D2D communication destination can be generated by determining a priority of each D2D Radio Bearer (RB) corresponding to the D2D communication destination, ranking the D2D RBs in a descending order of their priorities, and generating a queue of D2D RB priorities corresponding to the D2D communication destination; and allocating the resources corresponding to the D2D communication destination according to the queue of D2D RB priorities, and generating the MAC PDU corresponding to the D2D communication destination according to a result of allocating the resources.

Here the resources corresponding to the D2D communication destination can be allocated according to the queue of D2D RB priorities, and the MAC PDU corresponding to the D2D communication destination can be generated according to the result of allocating the resources, by allocating the resources for each D2D RB corresponding to the D2D communication destination as per Prioritized Bit Rate (PBR) according to the queue of D2D RB priorities; if there are no remaining resources after the resources are allocated, then determining resources allocated to each D2D RB in the D2D communication destination according to the result of allocating the resources, and organizing the corresponding MAC PDU for the D2D communication destination according to the resources.

Furthermore the resources corresponding to the D2D communication destination can be allocated according to the queue of D2D RB priorities, and the MAC PDU corresponding to the D2D communication destination can be generated according to the result of allocating the resources, by, if there are remaining resources after the resources are allocated, then allocating the remaining resources for data, for which no resources have been allocated, of each D2D RB corresponding to the D2D communication destination according to the queue of D2D RB priorities, and determining that all the remaining resources have been allocated, after all the data of each D2D RB in the queue of D2D RB priorities have resources allocated thereto, or all the remaining resources are allocated; and after all the remaining resources are allocated, determining the resources allocated to each D2D RB in the D2D communication destination according to the result of allocating the resources and the remaining resources, and organizing the corresponding MAC PDU for the D2D communication destination according to the resources.

In a real application, D2D communication resources for different D2D communication destinations can be determined in the technical solution of the invention in the following two modes:

1. Resources are Allocated in a Centralized Mode:

A D2D communication transmitting device makes a D2D communication Buffer State Report (BSR) carrying identification information of D2D communication destinations to which the BSR relates, to a resource allocation control node; and the resource allocation control node allocates D2D communication resources respectively according to the D2D BSR information fort the respective D2D communication destinations reported by the transmitting device, and then indicates a result of allocating the D2D communication resources to the D2D communication transmitting device via D2D communication resource allocation indication signaling, where the result of allocating the D2D communication resources carries the identification information of the D2D communication destinations, and their corresponding resources. The D2D transmitting device determines the resources allocated for the respective D2D communication destinations according to the received D2D communication resource allocation indication signaling.

Here the identifier of the D2D communication destination can be a group ID or a broadcast ID or a destination UE identifier (UE ID) or an RB identifier (the RB identifier can be an RB ID or a group ID/a broadest ID+a logical channel ID, or the like).

The D2D BSR can be made individually or jointly, where if the D2D BSR is made separately, then the transmitting device will report separately for each D2D communication destination D2D BSR information corresponding to the D2D communication destination; and if the D2D BSR is made collectively, then the transmitting device will report the D2D BSR information of all the D2D communication destinations once to the resource allocation control node.

2. Resources are Allocated in a Distributed Mode:

A D2D communication transmitting device determines for which D2D communication destinations D2D data need to be transmitted on a scheduling occasion, and their amounts of data to be transmitted, and then selects appropriate resources in pools of resources corresponding to the respective D2D communication destinations according to the amounts of data to be transmitted corresponding to the D2D communication destinations.

In a real application, the UE can organize the MAC PDU by firstly determining the resources corresponding to the respective D2D communication destinations, and then organizing the MAC PDU over the resources according to priorities of D2D Radio Bearers (RBs) corresponding to the D2D communication destinations.

Moreover the terminal can organize the MAC PDU by carrying the identification information of the D2D communication destination, and the identification information of the D2D transmitting device in the MAC PDU.

The technical solution above of the invention will be described below in details in connection with particular embodiments thereof.

A first embodiment relates to a D2D BSR procedure (where a D2D BSR is triggered per device, and is reported individually or jointly specific to D2D buffer states for respective D2D communication destinations), which will be described below in details as to configuration of D2D BSR parameters, a D2D BSR trigger mechanism, processing after a D2D BSR is made, and the format in which the D2D BSR is made respectively:

1) D2D BSR parameters are configured, where the D2D BSR related parameters can be configured by a resource allocation control node per device, including any one or combination of the following parameters; and of course, the same set of D2D BSR parameters can be multiplexed by D2D and D2N in the scenario where there are online devices.

D2D retxBSR-Timer which is a timer with a D2D BSR being disabled; and

D2D periodicBSR-Timer which is a timer with a BSR being made periodically.

2) A D2D BSR trigger mechanism where a D2D BSR is triggered per device under a trigger condition which can be any one of the following conditions:

A D2D regular BSR, which is a) triggered when there are incoming data with a higher priority than current data in a D2D buffer or incoming new data in the originally empty D2D buffer of the device; and b) triggered when the D2D retxBSR-Timer of the device expires and there are data in the buffer.

A D2D periodic BSR which is triggered when the D2D periodicBSR-Timer of the device expires.

A D2D padding BSR which can be triggered if the device organizing an MAC PDU of the device to the resource allocation control node has resources available (padding) in addition to data to be transmitted.

3) Processing after the D2D BSR is made, where if the D2D BSR is triggered and can be made, then the corresponding D2D periodicBSR-Timer and D2D retxBSR-Timer will be started or restarted, but it shall be noted that for the truncated D2D BSR the D2D periodicBSR-Timer cannot be started or restarted, but only the D2D retxBSR-Timer will be started or restarted.

4) The D2D BSR is made in such a format that the D2D BSR is reported in the form of an MAC Control Element (CE) including two components which are an MAC sub-header and an MAC CE, where the D2D BSR MAC CE includes two formats of a long D2D BSR and a short/truncated D2D BSR, and the truncated D2D BSR is in the same format as the short D2D BSR. Since D2D communication destinations making the D2D BSR need to be distinguished from each other, the D2D BSR MAC CE sub-header or the MAC CE will include identification information of the D2D communication destination. The identification information of the D2D communication destination can be in a number of forms, e.g., a group ID or a broadcast ID or a destination UE identifier (a UE ID) or an RB identifier (the RB identifier can be an RB ID or a group ID/a broadest ID+a logical channel ID, or the like).

The D2D BSR can be made individually or jointly, where if the D2D BSR is made separately, then the device will report separately for each D2D communication destination D2D BSR information corresponding to the D2D communication destination; and if the D2D BSR is made collectively, then the device will report the D2D BSR information of all the D2D communication destinations once to the resource allocation control node.

Figure 5:
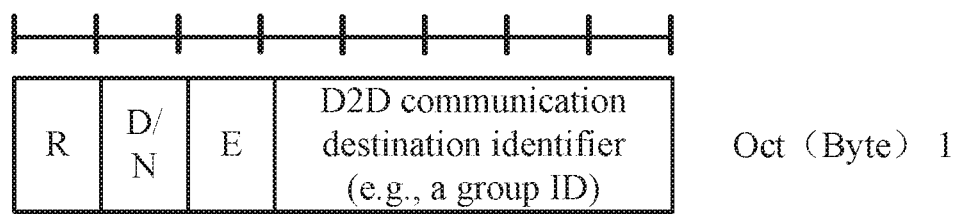
FIG. 5 is a schematic diagram of the format of an MAC sub-header in which D2D BSR information triggered per UE is reported separately according to an embodiment of the invention.
Figure 6:
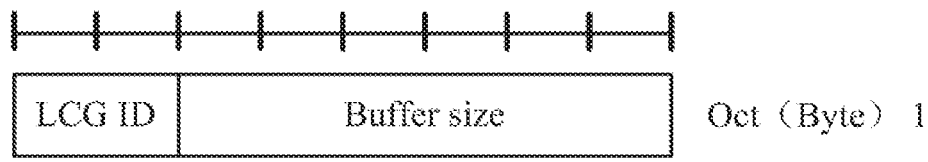
FIG. 6 is a schematic diagram of the format of a short D2D BSR MAC CE in which D2D BSR information triggered per UE is reported separately according to an embodiment of the invention.
Figure 7:
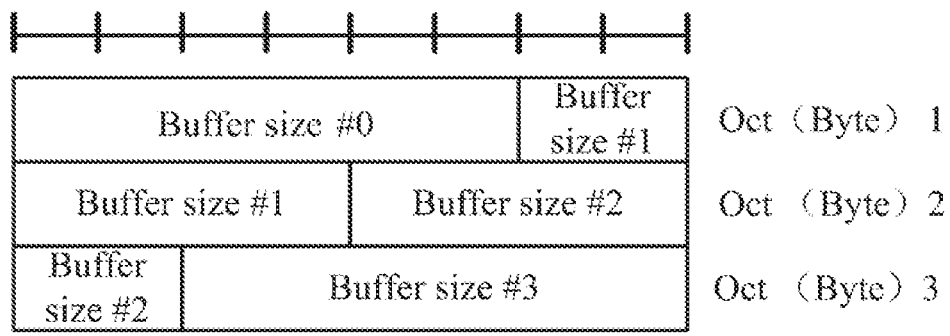
FIG. 7 is a schematic diagram of the format of a long D2D BSR MAC CE in which D2D BSR information triggered per UE is reported separately according to an embodiment of the invention.

If the D2D BSR is made separately, for example, then if a communication destination in the D2D BSR is a group ID, for example, then the BSR MAC CE sub-header and the MAC CE format can be as illustrated in FIG. 5, FIG. 6, and FIG. 7, where DIN in the sub-header indicates whether the D2D BSR MAC CE relates to a D2N link or a D2D link.

If the D2D BSR is made collectively, then "D2D communication destination identifier" in the MAC sub-header will indicate those groups, a bitmap of which is included in the D2D BSR MAC CE (on the precondition that the resource allocation control node and the UEs agree on group identifiers corresponding to respective bits), and then D2D buffer state information corresponding to the respective D2D communication destinations will be indicated sequentially in the bitmap; or "D2D communication destination identifier" in the MAC sub-header in the figures above will be determined as reserved bits, and then the identification information of the D2D communication destinations will be added before the respective D2D buffer state information in the D2D BSR MAC CE.

A second embodiment relates to a D2D BSR procedure (where a D2D BSR is triggered per D2D communication destination, and is reported separately specific to D2D buffer states for respective D2D communication destinations), which will also be described below in details as to configuration of D2D BSR parameters, a D2D BSR trigger mechanism, processing after a D2D BSR is made, and the format in which the D2D BSR is made respectively:

1) D2D BSR parameters are configured, where the D2D BSR related parameters can be configured by a resource allocation control node per device or D2D communication destination, including any one or combination of the following parameters; and of course, the same set of D2D BSR parameters can be applied to D2D and D2N in the scenario where there are online devices.

D2D retxBSR-Timer which is a timer with a D2D BSR being disabled; and

D2D periodicBSR-Timer which is a timer with a BSR being made periodically.

2) A D2D BSR trigger mechanism where a D2D BSR is triggered per D2D communication destination under a trigger condition which can be any one of the followings:

A D2D regular BSR, which is a) triggered when there are incoming data with a higher priority than current data in a D2D buffer of some specific D2D communication destination or incoming new data in the originally empty D2D buffer of the device for some specific D2D communication destination; and b) triggered when the D2D retxBSR-Timer of the device for some specific D2D communication destination expires and there are data in the buffer.

A D2D periodic BSR which is triggered when the D2D periodicBSR-Timer of the device for some specific D2D communication destination expires.

A D2D padding BSR which can be triggered if the device organizing an MAC PDU of the device to the resource allocation control node for some specific D2D communication destination has resources available (padding) in addition to data to be transmitted.

3) Processing after the D2D BSR is made, where if the D2D BSR is triggered and can be made, then the D2D periodicBSR-Timer and the D2D retxBSR-Timer corresponding to the D2D communication destination will be started or restarted, but it shall be noted that for the truncated D2D BSR, the D2D periodicBSR-Timer corresponding to the D2D communication destination can not be started or restarted, but only the D2D retxBSR-Timer corresponding to the D2D communication destination will be started or restarted.

4) The D2D BSR is made in such a format that the D2D BSR is reported in the form of an MAC Control Element (CE) including two components which are an MAC sub-header and an MAC CE, where the D2D BSR MAC CE includes two formats of a long D2D BSR and a short/truncated D2D BSR, and the truncated D2D BSR is in the same format as the short D2D BSR. Since D2D communication destinations making the D2D BSR need to be distinguished from each other, the D2D BSR MAC CE sub-header or the MAC CE will include identification information of the D2D communication destination. The identification information of the D2D communication destination can be in a number of forms, e.g., a group ID or a broadcast ID or a destination UE identifier (a UE ID) or an RB identifier (the RB identifier can be an RB ID or a group ID/a broadest ID+a logical channel ID, or the like).

The D2D BSR is made separately, where since the D2D BSR is made separately, the device reports separately for each D2D communication destination D2D BSR information corresponding to the D2D communication destination.

Figure 8:
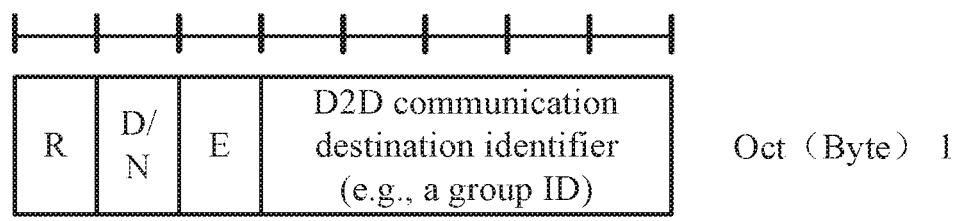
FIG. 8 is a schematic diagram of the format of an MAC sub-header in which D2D BSR information triggered per D2D communication destination is reported separately according to an embodiment of the invention.
Figure 9:
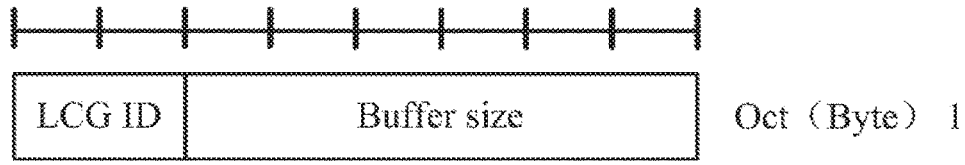
FIG. 9 is a schematic diagram of the format of a short D2D BSR MAC CE in which D2D BSR information triggered per D2D communication destination is reported separately according to an embodiment of the invention.
Figure 10:
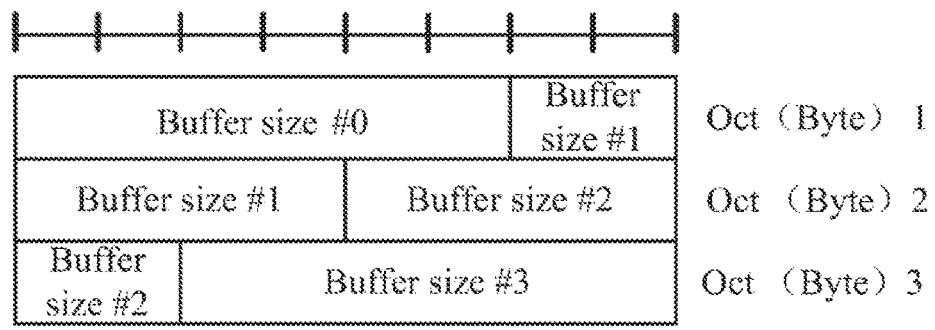
FIG. 10 is a schematic diagram of the format of a long D2D BSR MAC CE in which D2D BSR information triggered per D2D communication destination is reported separately according to an embodiment of the invention.

By way of an example, if the D2D communication destination is a group ID, for example, then the D2D BSR MAC CE sub-header and the D2D MAC CE format can be as illustrated in FIG. 8, FIG. 9, and FIG. 10, where D/N in the sub-header indicates whether the D2D BSR MAC CE relates to a D2N link or a D2D link.

In a third embodiment, D2D communication resources for different D2D communication destinations are determined (where resources are allocated in a centralized mode).

A resource allocation control node allocates D2D communication resources respectively based upon D2D BSR information for respective D2D communication destinations reported by a device. If there are limited D2D communication resources in the system, then the resource allocation control node will allocate the resources taking into account priorities of respective devices participating in D2D communication in response to a request served by the resource allocation control node, QoS parameters of the D2D communication service requested by the respective device, etc.

If the resource allocation control node determines resource allocation information of the respective D2D communication transmitting device served by the resource allocation control node, then the resource allocation control node will notify the corresponding D2D communication transmitting device via resource allocation indication signaling carrying identification information of the respective D2D communication destinations of the D2D communication transmitting device, and their corresponding resource allocation indication information (including time-frequency resources, modulation and coding schemes, etc.).

The D2D communication transmitting device determines particular resources allocated for the respective D2D communication destinations according to the received D2D communication resource allocation indication signaling.

In a fourth embodiment, D2D communication resources for different D2D communication destinations are determined (where resources are allocated in a distributed mode).

A D2D communication transmitting device determines for which D2D communication destinations D2D data need to be transmitted on a scheduling occasion, and their amounts of data to be transmitted, and then selects appropriate resources in pools of resources corresponding to the respective D2D communication destinations according to the amounts of data to be transmitted corresponding to the D2D communication destinations.

Particularly the pools of resources corresponding to the different D2D communication destinations may or may not be the same, or can be configured by a resource allocation node for UEs, or can be pre-configured in the UEs.

If there are limited D2D communication resources available, then the D2D communication transmitting device will determine particularly for which particular D2D RBs of which D2D communication destinations the resources are allocated, according to a QoS parameter of a D2D communication service to be served by the D2D communication transmitting device, etc., and then merges the resources allocated for the D2D RBs belonging to the same D2D communication destination as resources for the D2D communication destination.

In a fifth embodiment, a D2D communication transmitter composes an MAC PDU as follows:

In a real application, if the D2D communication transmitting device determines particular resources allocated for respective D2D communication destinations, then the D2D communication transmitting device will organize MAC PDUs of D2D communication respectively for the resources allocated for the respective D2D communication destinations, and transmit the organized MAC PDUs over the corresponding resources.

By way of an example, taking group communication as an example, a resource allocation control node allocates D2D communication resources for a device UE1 as follows:

| D2D communication destination ID | Resource allocation information |
|---|---|
| Group ID1 | D2D resource allocation information 1 (PRB positions, an MCS level, etc.) |
| Group ID2 | D2D resource allocation information 2 (PRB positions, an MCS level, etc.) |
| Group ID3 | No resources allocated |

Particularly the D2D communication transmitting UE needs to organize data in buffers corresponding to the group ID and the group ID 2 into MAC PDUs according to the resource allocation indication information above. The data need to be organized into the MAC PDU by taking into account priorities of D2D RBs in the group ID, that is, if the D2D RBs corresponding to the group ID are configured with the priorities and Prioritized Bit Rates (PBRs), then firstly a queue of D2D RB priorities will be created in a descending order of the priority parameters of the D2D RBs corresponding to the group ID, and resources will be allocated in two rounds according to the queue of D2D RB priorities as follows, and the MAC PDU will be organized particularly as follows:

In a first round of resource allocation, the resources are allocated in the first round sequentially for the respective RBs as per the PBRs according to the queue of priorities of the D2D RBs in the group ID. At the end of the first round of resource allocation, if there are still remaining resources, then the resources will be allocated in a second round: otherwise, the procedure resource allocation will be terminated.

In the second round of resource allocation, if there are still remaining resources corresponding to the group ID after the first round of allocation, then the resources will be allocated in the second round, where the resources are still allocated once for the amounts of remaining data over the respective RBs according to the queue of priorities of the D2D RBs in the group ID until the resources have been exhausted or all the data of the RBs have their resources allocated thereto.

As a result of the two rounds of resource allocation above, the resources are finally allocated to the respective D2D RBs in each group ID, and the MAC PDU is organized according to the result of resource allocation. The data in the MAC PDU are transmitted over the physical resources allocated to the group ID to which the MAC PDU belongs.

A sixth embodiment relates to the format of an MAC PDU.

Figure 11:
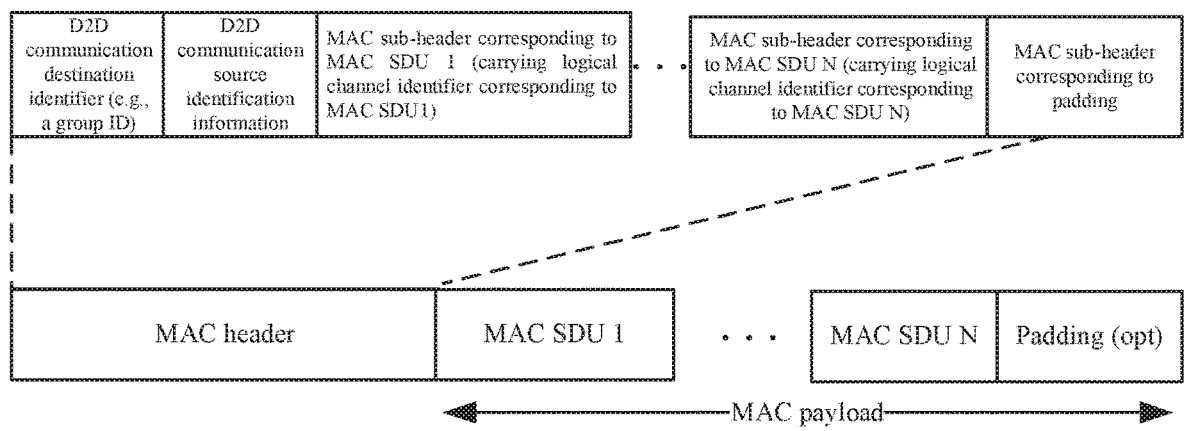
FIG. 11 is a schematic diagram of the format of an MAC PDU according to an embodiment of the invention.

In this embodiment, FIG. 11 illustrates the format of an MAC PDU, and as can be apparent from FIG. 11, the MAC PDU according to this embodiment includes the identifier of a D2D communication destination (which is carried particularly in an MAC sub-header or an MAC SDU dependent upon the size of the length thereof), and several MAC sub-headers and MAC SDUs for the D2D communication destination, and moreover the MAC PDU can further carry identification information of a D2D communication source.

In a real application, a D2D communication receiving device can retrieve D2D communication resources over which D2D communication interesting thereto is transmitted, from a resource allocation control node, and receive over the corresponding D2D communication resources. Of course, if the D2D communication receiving device can know accurately the positions of the resources for D2D communication interesting thereto, then the MAC PDU of a D2D transmitting device may not carry the identifier of the D2D communication destination, and the identifier of the D2D communication source.

The embodiments have been described in which the single processing steps in the D2D data communication process are performed in the respective embodiments, but the real D2D communication data transmission process can be performed in a combination of some of the embodiments above, for example, the first, third, fifth, and sixth embodiments, or the second, third, fifth, and sixth embodiments can be combined into the D2D communication data transmission flow in the centralized resource allocation mode; and the third, fourth, fifth, and sixth embodiments can be combined into the D2D communication data transmission flow in the distributed resource allocation mode.

As can be apparent, with the solutions above according to the invention, data from one device to different D2D communication destination devices will not be multiplexed in one MAC PDU so as to low a header overhead of the MAC PDU, and to prevent the D2D communication receiving devices from performing unnecessary blind detection to thereby save power.

Moreover according to an embodiment of the invention, there is further provided an apparatus for transmitting data in device to device communication.

Figure 12:
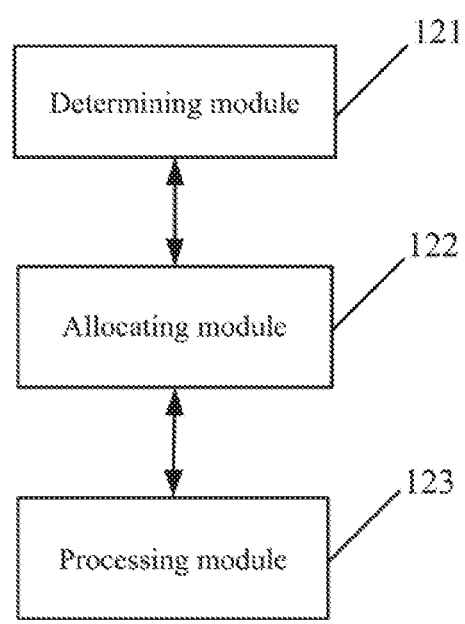
FIG. 12 is a schematic structured diagram of an apparatus for transmitting data in device to device communication according to an embodiment of the invention.

As illustrated in FIG. 12, an apparatus for transmitting data in device to device communication according to an embodiment of the invention includes:

A determining module 121 is configured to determine Device to Device (D2D) communication destinations corresponding to a transmitting User Equipment UE);

An allocating module 122 is configured to allocate corresponding resources for each D2D communication destination; and A processing module 123 is configured to generate for the resources corresponding to each D2D communication destination a media Access Control Protocol Data Unit (MAC PDU) corresponding to the D2D communication destination, and to transmit the MAC PDU over the resources corresponding to the D2D communication destination.

Moreover the apparatus for transmitting data in device to device communication further includes: a configuring module (not illustrated) configured to pre-configure a corresponding D2D communication destination identifier for the D2D communication destination.

Furthermore the processing module 123 is further configured to carry the D2D communication destination identifier in a Media Access Control (MAC) sub-header in the MAC PDU, or a Media Access Control Service Data Unit (MAC SDU) in the MAC PDU.

Where the D2D communication destination identifier includes at least one of a group identifier, a broadcast identifier, a destination UE identifier, and a Radio Bearer (RB) identifier.

Where the allocating module 122 can include: a receiving sub-module (not illustrated) configured to receive D2D Buffer State Report (BSR) information corresponding to each D2D communication destination, reported by the transmitting UE; a first determining sub-module (not illustrated)

configured to determine the corresponding resources allocated for each D2D communication destination, according to the D2D BSR information; and a processing sub-module (not illustrated) configured to generate resource allocation information according to the determined resources allocated for each D2D communication destination, and to send the resource allocation information to the transmitting UE, so that the transmitting UE determines the resources allocated for each D2D communication destination according to the resource al location information.

Where the resource allocation information can include a D2D communication destination identifier corresponding to each D2D communication destination, and the resources corresponding to each D2D communication destination.

Where the transmitting UE reports the D2D BSR information corresponding to each D2D communication destination individually or jointly.

Where a condition to trigger the transmitting UE, to report the D2D BSR information corresponding to the D2D communication destination includes at least one of the followings: there are incoming data with a higher priority than current data in a D2D buffer of the D2D communication destination; there are incoming new data in an originally empty D2D buffer corresponding to the D2D communication destination; a D2D BSR periodicity timer of the D2D communication destination expires; and when the MAC PDU is generated for the D2D communication destination, the resources corresponding to the D2D communication destination include available resources in addition to resources required for transmitting D2D data.

Where the D2D BSR information includes a D2D communication destination identifier corresponding to the D2D communication destination, and Buffer State (BS) information of a D2D buffer corresponding to the D2D communication destination.

Moreover the allocating module 122 can further include: a second determining sub-module (not illustrated) configured to determine the amount of data to be transmitted over each D2D logical channel or group of logical channels corresponding to each D2D communication destination; and a first allocating sub-module (not illustrated) configured to allocate the corresponding resources for each D2D communication destination according to the amount of data, and a pool of resources corresponding to each D2D communication destination.

Where the processing module 123 can include: a third determining sub-module (not illustrated) configured to determine a priority of each D2D Radio Bearer (RB) corresponding to the D2D communication destination, to rank the D2D RBs in a descending order of their priorities, and to generate a queue of D2D RB priorities corresponding to the D2D communication destination; and a generating sub-module (not illustrated) configured to allocate the resources corresponding to the D2D communication destination according to the queue of D2D RB priorities, and to generate the MAC PDU corresponding to the D2D communication destination according to a result of allocating the resources.

Where the generating sub-module can include: a second allocating sub-module (not illustrated) configured to allocate the resources for each D2D RB corresponding to the D2D communication destination as per Prioritized Bit Rate (PBR) according to the queue of D2D RB priorities and an organizing sub-module (not illustrated) configured, if there are no remaining resources after the resources are allocated, to determine resources allocated to each D2D RB in the D2D communication destination according to the result of allocating the resources, and to organize the corresponding MAC PDU for the D2D communication destination according to the resources.

Furthermore the generating sub-module can further include: a third allocating sub-module (not illustrated) configured, if there are remaining resources after the resources are allocated, to allocate the remaining resources for data, for which no resources have been allocated, of each D2D RB corresponding to the D2D communication destination according to the queue of D2D RB priorities, and to determine that all the remaining resources have been allocated, after all the data of each D2D RB in the queue of D2D RB priorities have resources allocated thereto, or all the remaining resources are allocated; and Moreover the organizing sub-module is further configured, after all the remaining resources are allocated, to determine the resources allocated to each D2D RB in the D2D communication destination according to the result of allocating the resources and the remaining resources, and to organize the corresponding MAC PDU for the D2D communication destination according to the resources.

In summary, with the technical solutions of the invention, an MAC PDU can be generated separately for each D2D communication destination of the transmitting UE, so that data from one device to different D2D communication destination devices will not be multiplexed in one MAC PDU so as to low a header overhead of the MAC PDU, and to prevent the receiving devices from performing unnecessary blind detection to thereby save power.

The underlying principle of the invention has been described above in connection with the particular embodiments thereof, but it shall be noted that those ordinarily skilled in the art can appreciate that all or any of the steps or components in the method and the apparatus according to the invention can be embodied in hardware, firmware, software, or a combination thereof in any computing device (including a processor, a storage medium, etc.) or network of computing devices, and this can be achieved by those ordinarily skilled in the art employing their general programming skills upon reading the disclosure of the invention.

Thus the object of the invention can also be attained by running a program or a set of programs on any computing device which can be a well-known general-purpose device. Thus the object of the invention can also be attained by providing only a program product including program codes for embodying the methods or apparatuses. That is, such a program product also constitutes the invention, and a storage medium in which such a program product is stored also constitutes the invention. Apparently the storage medium can be any well-known storage medium or any storage medium to be developed later.

There is further provided a storage medium (which can be an ROM, an RAM, a hard disk, a removable memory, etc.) according to an embodiment of the invention, which is embedded in a computer program for performing the steps of transmitting data in device to device communication, where the computer program includes code segments configured to perform the steps of: determining Device to Device (D2D) communication destinations corresponding to a transmitting User Equipment (UE); allocating corresponding resources for each D2D communication destination; and generating for the resources corresponding to each D2D communication destination a media Access Control Protocol Data Unit (MAC PDU) corresponding to the D2D communication destination, and transmitting the MAC PDU over the resources corresponding to the D2D communication destination.

According to an embodiment of the invention, there is further provided a computer program including code segments configured to perform the steps of transmitting data in device to device communication: determining Device to Device (D2D) communication destinations corresponding to a transmitting User Equipment (UE); allocating corresponding resources for each D2D communication destination; and generating for the resources corresponding to each D2D communication destination a media Access Control Protocol Data Unit (MAC PDU) corresponding to the D2D communication destination, and transmitting the MAC PDU over the resources corresponding to the D2D communication destination.

In the case that the embodiments of the invention are embodied in software or firmware, program constituting the software or firmware can be installed from a storage medium or a network to a computer with a dedicated hardware structure (e.g., a general-purpose computer 1300 illustrated in FIG. 13) which can perform various functions, etc., above when various pieces of programs are installed thereon.

Figure 13:
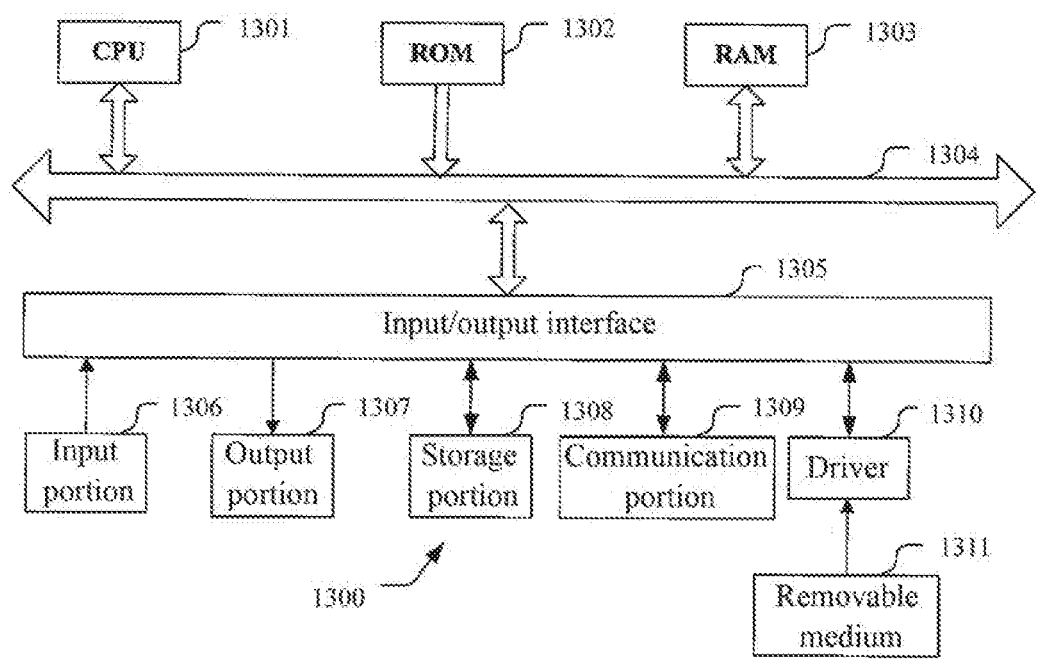
FIG. 13 is an exemplary structural block diagram of a computer in which the technical solutions of the invention are embodied.

In FIG. 13, a Central Processing Unit (CPU) 1301 performs various processes according to program stored in a Read Only Memory (ROM) 1302 or loaded from a storage portion 1308 into a Random Access Memory (RAM) 1303 in which data required when the CPU 1301 performs the various processes, etc., is also stored as needed. The CPU 1301, the ROM 1302, and the RAM 1303 are connected to each other via a bus 1304 to which an input/output interface 1305 is also connected.

The following components are connected to the input/output interface 1305: an input portion 1306 including a keyboard, a mouse, etc.; an output portion 1307 including a display, e.g., a Cathode Ray Tube (CRT), a Liquid Crystal Display (LCD), etc., a speaker, etc.; a storage port 1308 including a hard disk, etc.; and a communication portion 1309 including a network interface card, e.g., an LAN card, an MODEM, etc. The communication portion 1309 performs a communication process over a network, e.g., the Internet.

A driver 1310 is also connected to the input/output interface 1305 as needed. A removable medium 1311, a magnetic disk, an optical disk, an optic-magnetic disk, a semiconductor memory, etc., can be installed on the driver 1310 as needed so that computer program fetched therefrom can be installed into the storage portion 1308 as needed.

In the case that the foregoing series of processes are performed in software, program constituting the software can be installed from a network, e.g., the Internet, etc., or a storage medium, e.g., the removable medium 1311, etc.

Those skilled in the art shall appreciate that such a storage medium will not be limited to the removable medium 1311 illustrated in FIG. 10 in which the program is stored and which is distributed separately from the apparatus to provide a user with the program. Examples of the removable medium 1311 include a magnetic disk (including a Floppy Disk (a registered trademark)), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 1302, a hard disk included in the storage portion 1308, etc., in which the program is stored and which is distributed together with the apparatus including the same to the user.

It shall be further noted that apparently the respective components or steps in the apparatuses and methods according to the invention can be decomposed and/or recombined. These decompositions and/or recombinations shall be regarded as equivalent solutions of the invention. Furthermore the steps of performing the foregoing series of processes can naturally be performed in a temporal sequence in the described order but may not necessarily be performed in a temporal sequence. Some of the steps can be performed concurrently or independently of each other.

Although the invention and the advantages thereof have been described in details, it shall be appreciated that various changes, substitutions, and variations can be made without departing from the spirit and scope of the invention as defined in the appended claims. Furthermore the terms "include", "comprise" and any variants thereof in the context are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

The invention claimed is:

1. A method for transmitting data in device to device communication, comprising:
   determining Device to Device (D2D) communication destinations corresponding to a transmitting User Equipment (UE);
   allocating a plurality of groups of resources each corresponding to a respective one of the D2D communication destinations; and
   generating, for each one of the D2D communication destinations, a media Access Control Protocol Data Unit (MAC PDU) according to a respective group of resources corresponding to the one of the D2D communication destinations; carrying a D2D communication destination identifier corresponding to the one of the D2D communication destinations in a Media Access Control (MAC) sub-header or a Media Access Control Service Data Unit (MAC SDU) in the MAC PDU corresponding to the one of the D2D communication destinations; and transmitting the MAC PDU over the respective group of resources;
   wherein the D2D communication destination identifier comprises at least one of a group identifier, or a broadcast identifier.

2. The method for transmitting data according to claim 1, wherein before carrying the D2D communication destination identifier in the MAC sub-header or the MAC SDU in the MAC PDU, the method further comprises:
   pre-configuring the corresponding D2D communication destination identifier for the one of the D2D communication destinations.

3. The method for transmitting data according to claim 1, wherein allocating the plurality of groups of resources each corresponding to the respective one of the D2D communication destinations comprises:
   receiving D2D Buffer State Report (BSR) information corresponding to the one of the D2D communication destinations, reported by the transmitting UE;
   determining the group of resources allocated for the one of the D2D communication destinations, according to the D2D BSR information corresponding to the one of the D2D communication destinations; and generating resource allocation information according to the group of resources, and sending the resource allocation information to the transmitting UE, so that the transmitting UE determines the respective group of resources allocated for the one of the D2D communication destinations according to the resource allocation information;

wherein the resource allocation information comprises the D2D communication destination identifier corresponding to the one of the D2D communication destinations, and the group of resources corresponding to the one of the D2D communication destinations;

wherein the D2D BSR information corresponding to the one of the D2D communication destinations comprises the D2D communication destination identifier, and Buffer State (BS) information of a D2D buffer corresponding to the one of the D2D communication destinations.

4. The method for transmitting data according to claim 3, wherein the transmitting UE reports BSR information corresponding to the respective D2D communication destinations individually or jointly.

5. The method for transmitting data according to claim 3, wherein a condition to trigger the transmitting UE to report the D2D BSR information corresponding to the one of the D2D communication destinations comprises at least one of the followings:

there are incoming data with a higher priority than current data in a D2D buffer of the one of the D2D communication destinations;

there are incoming new data in an originally empty D2D buffer corresponding to the one of the D2D communication destinations;

a D2D BSR periodicity timer of the one of the D2D communication destinations expires; and when the MAC PDU is generated for the one of the D2D communication destinations, the respective group of resources comprises available resources in addition to resources required for transmitting D2D data.

6. The method for transmitting data according to claim 1, wherein the allocating the plurality of groups of resources each corresponding to the respective one of the D2D communication destinations comprises:

determining the amount of data to be transmitted over each D2D logical channel or group of logical channels corresponding to the one of the D2D communication destinations; and allocating the group of resources for the one of the D2D communication destinations according to the amount of data, and a pool of resources corresponding to the one of the D2D communication destinations.

7. The method for transmitting data according to claim 1, wherein generating, for the one of the D2D communication destinations, the MAC PDU according to the respective group of resources comprises:

determining priorities of respective D2D Radio Bearers (RBs) corresponding to the one of the D2D communication destinations, ranking the D2D RBs in a descending order of the priorities, and generating a queue of D2D RB priorities corresponding to the one of the D2D communication destinations; and allocating the respective group of resources according to the queue of D2D RB priorities, and generating the MAC PDU according to a result of allocating the respective group of resources.

8. The method for transmitting data according to claim 7, wherein allocating the respective group of resources according to the queue of D2D RB priorities, and generating the MAC PDU according to the result of allocating the respective group of resources comprises:

allocating the respective group of resources each corresponding to a respective one of the D2D RBs as per Prioritized Bit Rate (PBR) according to the queue of D2D RB priorities; and when there are no remaining resources after the respective group of resources are allocated, then determining resources allocated to each one of the D2D RBs according to the result of allocating the respective group of resources, and organizing the MAC PDU according to the resources allocated to the each one of the D2D RBs.

9. The method for transmitting data according to claim 8, wherein allocating the respective group of resources according to the queue of D2D RB priorities, and generating the MAC PDU according to the result of allocating the respective group of resources further comprises:

when there are remaining resources after the respective group of resources are allocated, then allocating the remaining resources for data, for which no resources have been allocated, of the respective one of the D2D RBs according to the queue of D2D RB priorities, and determining that all the remaining resources have been allocated, after all the data of the each one of the D2D RBs in the queue of D2D RB priorities have resources allocated thereto, or all the remaining resources are allocated; and determining the resources allocated to the each one of the D2D RBs according to the result of allocating the respective group of resources and a result of allocating the remaining resources, and organizing the MAC PDU according to the resources allocated to the each one of the D2D RBs.

10. An apparatus for transmitting data in device to device communication, comprising:

a processor;

a memory, wherein the memory stores one or more computer readable program codes, and the processor is configured to execute the computer readable program codes to:

determine Device to Device (D2D) communication destinations corresponding to a transmitting User Equipment (UE);

allocate a plurality of groups of resources each corresponding to a respective one of the D2D communication destinations; and generate, for each one of the D2D communication destinations, a media Access Control Protocol Data Unit (MAC PDU) according to a group of resources corresponding to the one of the D2D communication destinations; carry a D2D communication destination identifier corresponding to the one of the D2D communication destinations in a Media Access Control (MAC) sub-header or a Media Access Control Service Data Unit (MAC SDU) in the MAC PDU corresponding to the one of the D2D communication destinations; and transmit the MAC PDU over the respective group of resources;

wherein the D2D communication destination identifier comprises at least one of: a group identifier, or a broadcast identifier.

11. The apparatus for transmitting data according to claim 10, wherein the processor is further configured to execute the computer readable program codes to:

pre-configure the corresponding D2D communication destination identifier for the one of the D2D communication destinations.

12. The apparatus for transmitting data according to claim 10, wherein the processor is further configured to execute the computer readable program codes to:
receive D2D Buffer State Report (BSR) information corresponding to the one of the D2D communication destinations, reported by the transmitting UE;
determine the respective group of resources allocated for the one of the D2D communication destinations, according to the D2D BSR information corresponding to the one of the D2D communication destinations; and
generate resource allocation information according to the group of resources, and send the resource allocation information to the transmitting UE, so that the transmitting UE determines the respective group of resources allocated for the one of the D2D communication destinations according to the resource allocation information;
wherein the resource allocation information comprises the D2D communication destination identifier corresponding to the one of the D2D communication destinations, and the respective group of resources corresponding to the one of the D2D communication destinations;
wherein the D2D BSR information corresponding to the one of the D2D communication destinations comprises the D2D communication destination identifier, and Buffer State (BS) information of a D2D buffer corresponding to the one of the D2D communication destinations.

13. The apparatus for transmitting data according to claim 12, wherein the transmitting UE reports D2D BSR information corresponding to the respective D2D communication destinations individually or jointly.

14. The apparatus for transmitting data according to claim 12, wherein a condition to trigger the transmitting UE to report the D2D BSR information corresponding to the one of the D2D communication destinations comprises at least one of the followings:
there are incoming data with a higher priority than current data in a D2D buffer of the one of the D2D communication destinations;
there are incoming new data in an originally empty D2D buffer corresponding to the one of the D2D communication destinations;
a D2D BSR periodicity timer of the one of the D2D communication destinations expires; and
when the MAC PDU is generated for the one of the D2D communication destinations, the respective group of resources comprises available resources in addition to resources required for transmitting D2D data.

15. The apparatus for transmitting data according to claim 10, wherein the processor is further configured to execute the computer readable program codes to:
determine the amount of data to be transmitted over each D2D logical channel or group of logical channels corresponding to the one of the D2D communication destinations; and
allocate the group of resources for the one of the D2D communication destinations according to the amount of data, and a pool of resources corresponding to the one of the D2D communication destinations.

16. The apparatus for transmitting data according to claim 10, wherein the processor is further configured to execute the computer readable program codes to:
determine priorities of respective D2D Radio Bearers (RBs) corresponding to the one of the D2D communication destinations, rank the D2D RBs in a descending order of the priorities, and generate a queue of D2D RB priorities corresponding to the one of the D2D communication destinations; and
allocate the respective group of resources according to the queue of D2D RB priorities, and generate the MAC PDU according to a result of allocating the respective group of resources.

17. The apparatus for transmitting data according to claim 16, wherein the processor is further configured to execute the computer readable program codes:
to allocate the respective group of resources each corresponding a respective one of the D2D RBs as per Prioritized Bit Rate (PBR) according to the queue of D2D RB priorities; and
when there are no remaining resources after the respective group of resources are allocated, to determine resources allocated to each one of the D2D RBs according to the result of allocating the respective group of resources, and to organize the MAC PDU according to the resources allocated to the each one of the D2D RBs.

18. The apparatus for transmitting data according to claim 17, wherein the processor is further configured to execute the computer readable program codes:
when there are remaining resources after the respective group of resources are allocated, to allocate the remaining resources for data, for which no resources have been allocated, of the respective one of the D2D RBs according to the queue of D2D RB priorities, and to determine that all the remaining resources have been allocated, after all the data of the each one of the D2D RBs in the queue of D2D RB priorities have resources allocated thereto, or all the remaining resources are allocated; and to determine the resources allocated to the each one of the D2D RBs according to the result of allocating the respective group of resources and a result of allocating the remaining resources, and to organize the MAC PDU according to the resources allocated to the each one of the D2D RBs.

* * * * *